US010661597B2

(12) United States Patent
Shibahara et al.

(10) Patent No.: US 10,661,597 B2
(45) Date of Patent: May 26, 2020

(54) DECORATIVE FILM AND ARTICLE INTEGRATED THEREWITH

(71) Applicant: 3M INNOVATIVE PROPERTIES COMPANY, St. Paul, MN (US)

(72) Inventors: Norihito Shibahara, Hachioji (JP); Akihiko Nakayama, Gotemba (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/543,423

(22) PCT Filed: Feb. 1, 2016

(86) PCT No.: PCT/US2016/015882
§ 371 (c)(1),
(2) Date: Jul. 13, 2017

(87) PCT Pub. No.: WO2016/126571
PCT Pub. Date: Aug. 11, 2016

(65) Prior Publication Data
US 2017/0355223 A1  Dec. 14, 2017

(30) Foreign Application Priority Data

Feb. 4, 2015 (JP) .................. 2015-020603

(51) Int. Cl.
*B32B 1/08* (2006.01)
*B32B 3/30* (2006.01)
(Continued)

(52) U.S. Cl.
CPC ............... *B44F 1/10* (2013.01); *B32B 1/08* (2013.01); *B32B 3/30* (2013.01); *B32B 7/06* (2013.01);
(Continued)

(58) Field of Classification Search
CPC combination set(s) only.
See application file for complete search history.

(56) References Cited

U.S. PATENT DOCUMENTS

2012/0140316 A1   6/2012  Suzuki et al.

FOREIGN PATENT DOCUMENTS

EP   1 669 191   6/2006
JP   S61-10414   1/1986
(Continued)

OTHER PUBLICATIONS

Machine Translation of JP 1996(H08)1082512 via EPO website.*
(Continued)

*Primary Examiner* — Laura C Powers
(74) *Attorney, Agent, or Firm* — Philip P. Soo

(57) ABSTRACT

A decorative film that can handle various adherend shapes and application methods and has a visual effect that changes according to viewing angle. The decorative film of one embodiment includes a substrate layer, a photoluminescent layer that is adjacent to the substrate layer and has an unevenly-shaped surface, a transparent resin layer adjacent to the photoluminescent layer, and an outermost layer. A storage elastic modulus of at least the substrate layer or the transparent resin layer is $1 \times 10^6$ Pa to $1.5 \times 10^8$ Pa in a temperature range of 100° C. to 150° C. when measured under conditions of a frequency of 10 Hz and a shearing mode.

10 Claims, 2 Drawing Sheets

(51) Int. Cl.
*B32B 7/06* (2019.01)
*B32B 7/12* (2006.01)
*B44C 1/10* (2006.01)
*B44F 1/10* (2006.01)
*C08J 7/04* (2006.01)
*B32B 27/08* (2006.01)
*B32B 27/20* (2006.01)
*B32B 27/30* (2006.01)
*B32B 27/32* (2006.01)
*B32B 27/36* (2006.01)
*B32B 27/40* (2006.01)

(52) U.S. Cl.
CPC ............... *B32B 7/12* (2013.01); *B32B 27/08* (2013.01); *B32B 27/20* (2013.01); *B32B 27/308* (2013.01); *B32B 27/32* (2013.01); *B32B 27/36* (2013.01); *B32B 27/365* (2013.01); *B32B 27/40* (2013.01); *B44C 1/105* (2013.01); *C08J 7/0423* (2020.01); *B32B 2255/10* (2013.01); *B32B 2255/26* (2013.01); *B32B 2264/102* (2013.01); *B32B 2264/105* (2013.01); *B32B 2270/00* (2013.01); *B32B 2274/00* (2013.01); *B32B 2307/412* (2013.01); *B32B 2307/414* (2013.01); *B32B 2307/422* (2013.01); *B32B 2307/51* (2013.01); *B32B 2307/514* (2013.01); *B32B 2307/732* (2013.01); *B32B 2307/748* (2013.01); *B32B 2307/75* (2013.01); *B32B 2405/00* (2013.01); *B32B 2451/00* (2013.01); *C08J 2367/02* (2013.01); *C08J 2433/00* (2013.01); *C08J 2433/12* (2013.01); *C08J 2475/04* (2013.01)

(56) References Cited

FOREIGN PATENT DOCUMENTS

| | | |
|---|---|---|
| JP | 1992(H04)-307242 | 10/1992 |
| JP | 05-004310 | 1/1993 |
| JP | 1996(H08)-108512 | 10/1994 |
| JP | 7-137221 | 5/1995 |
| JP | 9-99534 | 10/1995 |
| JP | 8-025604 | 1/1996 |
| JP | 08-150692 | 6/1996 |
| JP | H11-277683 | 10/1999 |
| JP | WO 2000/23287 | 4/2000 |
| JP | 2002-370331 | 12/2002 |
| JP | 2003-136666 | 5/2003 |
| JP | 2005-014374 | 1/2005 |
| JP | 2005-103794 A | 4/2005 |
| JP | 2007-045067 | 2/2007 |
| JP | 2007-054998 | 3/2007 |
| JP | 2007-245409 | 9/2007 |
| JP | 2012-192743 | 10/2012 |
| JP | 5151107 B2 | 12/2012 |

OTHER PUBLICATIONS

International Search Report, PCT/US2016/015882, 3 pages.
Basis for Thermal Analysis Application, Edited by Matthias Wagner, Translated by Lu Liming, Press of Donghua University, Edition 1, Jan. 2011, pp. 186-187).
Shinji Shimizu, "Report of kinematic viscosity measurement data by DVA-200 series report Jan. 12, 2011", http;://www/itkdva.jp/pdf/DataSheet.pdf (Aug. 8, 2019).

* cited by examiner

DECORATIVE FILM AND ARTICLE INTEGRATED THEREWITH

CROSS REFERENCE TO RELATED APPLICATIONS

This application is a national stage filing under 35 U.S.C. 371 of PCT/US2016/015882, filed Feb. 1, 2016, which claims the benefit of JP Patent Application No. 2015-020603, filed Feb. 4, 2015, the disclosures of which are incorporated by reference in their entirety herein.

FIELD

The present disclosure relates to a decorative film that has a visual effect that changes according to viewing angle and an article integrated therewith.

BACKGROUND

Among plywood where natural wood is sliced, there are those that have a visual effect that changes according to viewing angle. For example, a plywood using Hawaiian koa or ash has a visual effect where not only a glossiness but also a wood grain pattern changes when the viewing angle changes. Meanwhile, a glossiness of a metal surface is emphasized by a strength of a reflected light changing when a viewing angle changes. It is also known that when the strength of the reflected light changes, the metal surface appears to be three-dimensional, that is, to have depth.

A decorative film or sheet that can impart such visual effects to an adherend is conventionally known.

Patent Literature JP2007-054998A describes "a decorative molding that stacks, on a three-dimensional surface of an injection-molded resin article, a photoluminescent layer, a transparent resin sheet having an embossed uneven pattern on a reverse side that is a resin-molded-article side, a printed picture layer, and a transparent protective coating film in that order."

Patent Literature JP2005-103794A describes "a decorative sheet that is formed by stacking a photoluminescent layer on a reverse surface of a transparent resin substrate sheet, wherein a surface of the transparent resin substrate sheet is partitioned into a high-gloss region whose glossiness is relatively high compared to its surroundings and a low-gloss region whose glossiness is relatively low compared to its surroundings, a thickness of the transparent resin substrate sheet is formed relatively thick in the high-gloss region and relatively thin in the low-gloss region, and an uneven pattern corresponding to the high-gloss region and the low-gloss region is visually expressed."

SUMMARY

A decorative film or sheet that has a visual effect that changes according to viewing angle includes therein a photoluminescent layer having an unevenly-shaped surface. The photoluminescent layer is generally extremely thin (for example, a thickness of about 10 nm to about 100 μm), and when, for example, applying the decorative film to a surface of an adherend having a three-dimensional surface, it is sometimes easily damaged by a large stress being applied locally (for example, at an apex portion of an uneven shape). This may cause a poor appearance of the decorative film.

In methods that require heating when applying the decorative film and, as necessary, deformation of the film—for example, insertion molding (IM), a three-dimensional overlay method (TOM), and the like—there is a situation where due to heating the uneven shape is deformed or is lost such that an expected visual effect of the decorative film cannot be exhibited.

The present disclosure provides a decorative film that can handle various adherend shapes and application methods and has a visual effect that changes according to viewing angle.

According to one embodiment of the present disclosure, a decorative film is provided that includes a substrate layer, a photoluminescent layer that is in contact with or at least adjacent to the substrate layer and has an unevenly-shaped surface, a transparent resin layer in contact with or at least adjacent to the photoluminescent layer, and an outermost layer. It can be desirable for the layers of the decorative film to be in that order. A storage elastic modulus of at least the substrate layer or the transparent resin layer is $1 \times 10^6$ Pa to $1.5 \times 10^8$ Pa in a temperature range of 100° C. to 150° C. when measured under conditions of a frequency of 10 Hz and a shearing mode.

According to another embodiment of the present disclosure, an article is provided that covers the decorative film on a substrate article to be integrated therewith.

According to the present disclosure, a decorative film is provided that can handle various adherend shapes and application methods and has a visual effect that changes according to viewing angle. The decorative film of the present disclosure can have high resistance against stress, deformation, heating, and the like applied thereto and therefore can be used particularly favorably in uses that apply the decorative film by IM, a TOM, or the like to an adherend having a three-dimensional shape.

Note that the above description is not to be deemed as disclosing every embodiment of the present invention and every advantage relating to the present invention.

DESCRIPTION OF EMBODIMENTS

A more detailed description is given below with an object of illustrating representative embodiments of the present invention, but the present invention is not limited to these embodiments.

In the present disclosure, "film" also includes a stacked body having flexibility referred to as a "sheet."

In the present disclosure, "storage elastic modulus" is a shearing storage elastic modulus G' of when viscoelasticity measurement is performed in a shearing mode of a frequency of 10 Hz using a dynamic viscoelasticity measurement device.

In the present disclosure, "transparent" signifies that an average transmittance of a visible-light region is about 60% or more, preferably about 80% or more, and more preferably about 90% or more.

In the present disclosure, "(meth)acryl" signifies an acryl or a methacryl, and "(meth)acrylate" signifies an acrylate or a methacrylate.

In the present disclosure, "three-dimensional overlay method" (also simply referred to as "TOM" in the present disclosure) refers to a molding method that includes a step of preparing a film and an article having a three-dimensional shape; a step of disposing the film and the article in a vacuum chamber having therein a heating device, the film separating an interior space of the vacuum chamber into two and the article being disposed in one of the separated interior spaces; a step of heating the film by the heating device; a step of placing the interior space in which the article is disposed and an interior space on an opposite side thereof in a reduced-pressure atmosphere; and a step of causing the article and the film to make contact while the interior space in which the article is disposed is placed in the reduced-pressure atmosphere and the interior space on the opposite side is placed in a pressurized atmosphere or a normal-pressure atmosphere so as to cover the article with the film.

A decorative film of one embodiment of the present disclosure includes a substrate layer, a photoluminescent layer that is in contact with or at least adjacent to the substrate layer and has an unevenly-shaped surface, a transparent resin layer in contact with or at least adjacent to the photoluminescent layer, and an outermost layer. It can be desirable for the layers of the decorative film to be in that order. A storage elastic modulus of at least the substrate layer or the transparent resin layer is about $1\times10^6$ Pa to about $1.5\times10^8$ Pa in a temperature range of 100° C. to 150° C. when measured under conditions of a frequency of 10 Hz and a shearing mode.

Figure 1:
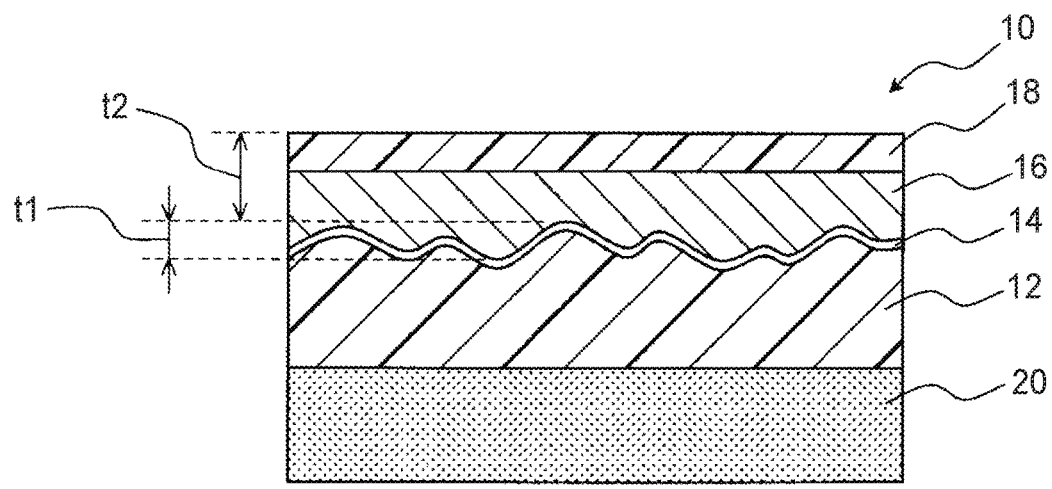
FIG. 1 is a cross-sectional view of a decorative film according to an embodiment of the present disclosure.

FIG. 1 illustrates a cross-sectional view of a decorative film 10 according to this one embodiment of the present disclosure. The decorative film 10 includes a substrate layer 12, a photoluminescent layer 14 that has an unevenly-shaped surface, a transparent resin layer 16, and an outermost layer 18. The decorative film 10 may further include as an optional element an additional layer such as a design layer, a joining layer that joins the layers configuring the decorative film, or an adhesive layer for installing the decorative film to a substrate article. In FIG. 1, an adhesive layer 20 is illustrated as the optional element.

In FIG. 1, the photoluminescent layer 14 is adjacent to so as to be in contact with the substrate layer 12 and the transparent resin layer 16. In the present disclosure, "adjacent," in addition to a situation where the photoluminescent layer directly contacts the substrate layer and/or the transparent resin layer, also includes a situation where interposed between the photoluminescent layer and the substrate layer and/or the transparent resin layer is another layer such as a primer layer or a thin joining layer or a surface treatment such as a corona treatment, a plasma treatment, or a flame treatment. In a situation where the photoluminescent layer and the substrate layer and the transparent resin sheet do not make direct contact, a maximum distance between these layers is generally about 10 μm or less, about 5 μm or less, or about 1 μm or less.

As the substrate layer, various resins, for example, an acrylic resin that includes polymethyl methacrylate (PMMA); polyurethane (PU); polyvinyl chloride (PVC); a polycarbonate (PC); an acrylonitrile-butadiene-styrene copolymer (ABS); a polyolefin such as polyethylene (PE) or polypropylene (PP); a polyester such as polyethylene terephthalate (PET) or polyethylene naphthalate; a copolymer such as an ethylene-acrylic acid copolymer, an ethylene-ethyl acrylate copolymer, or an ethylene-vinyl acetate copolymer; or a mixture thereof can be used. From viewpoints such as strength and impact resistance, polyurethane, polyvinyl chloride, polyethylene terephthalate, the acrylonitrile-butadiene-styrene copolymer, and the polycarbonate can be used advantageously as the substrate layer. The substrate layer is a layer serving as a base for installing the decorative film to an adherend. The substrate layer can also function as a protective layer that provides uniform stretching during molding and/or effectively protects a structure from puncture, impact, and the like from the outside. The substrate layer may be adhesive. In this embodiment, the decorative film can be installed on the article without requiring the adhesive layer that is described below. The adhesive substrate layer can be formed by the same material as the adhesive layer that is described below.

A thickness of the substrate layer may be various, but from a viewpoint of imparting the above functions to the decorative film without adversely affecting a moldability of the decorative film, it is generally about 10 μm or more, about 20 μm or more, or about 50 μm or more and can be made to be about 500 μm or less, about 200 μm or less, or about 100 μm or less. The thickness of the substrate layer in a situation where the substrate layer is not flat signifies a thickness of the thinnest portion in the substrate layer.

In several embodiments, the storage elastic modulus of the substrate layer is about $1.0\times10^6$ Pa or more, about $1.5\times10^6$ Pa or more, or about $2.0\times10^6$ Pa or more and about $1.5\times10^8$ Pa or less or about $1.3\times10^8$ Pa or less in a temperature range of 100° C. to 150° C. when measured under the conditions of the frequency of 10 Hz and the shearing mode. By the storage elastic modulus of the substrate layer being in the above range, when stress, heat, or the like is applied to the decorative film or when the decorative film deforms, damage of the photoluminescent layer is prevented, the unevenly-shaped surface of the photoluminescent layer is maintained, and a visual effect that changes according to viewing angle can be exhibited.

The substrate layer may be one layer or may have a multilayer structure. In a situation where the substrate layer has the multilayer structure, the storage elastic modulus of the substrate layer signifies one value measured for the multilayer structure overall where storage elastic moduli of individual layers are composited.

In one embodiment, the substrate layer is adhesive and can also be used in installation to the substrate article. In this embodiment, the transparent resin layer generally has a storage elastic modulus of about $1.0\times10^6$ Pa or more, about $1.5\times10^6$ Pa or more, or about $2.0\times10^6$ Pa or more and about $1.5\times10^8$ Pa or less or about $1.3\times10^8$ Pa or less in a temperature range of 100° C. to 150° C. when measured under the conditions of the frequency of 10 Hz and the shearing mode; this contributes to damage prevention of the photoluminescent layer and maintenance of the unevenly-shaped surface of the photoluminescent layer.

As the transparent resin layer, various transparent resins, for example, an acrylic resin that includes polymethyl methacrylate (PMMA); polyurethane (PU); polyvinyl chloride (PVC); a polycarbonate (PC); an acrylonitrile-butadiene-styrene copolymer (ABS); a polyolefin such as polyethylene (PE) or polypropylene (PP); a polyester such as polyethylene terephthalate (PET) or polyethylene naphthalate; a copolymer such as an ethylene-acrylic acid copolymer, an ethylene-ethyl acrylate copolymer, or an ethylene-vinyl acetate copolymer; or a mixture thereof can be used. From viewpoints such as transparency, strength, and impact resistance, the acrylic resin, polyurethane, polyvinyl chloride, polyethylene terephthalate, the acrylonitrile-butadiene-styrene copolymer, and the polycarbonate can be used advantageously as the transparent resin. The transparent resin layer can also function as a protective layer that protects the unevenly-shaped surface of the photoluminescent layer from puncture, impact, and the like. The transparent resin layer may be adhesive. In this embodiment, the outermost layer, the design layer, or the like can be directly laminated onto the transparent resin layer without interposing the joining layer therebetween. The adhesive transparent resin layer can be formed by the same material as the adhesive layer that is described below.

A thickness of the transparent resin layer may be various, but from a viewpoint of imparting the above functions to the decorative film without adversely affecting the moldability of the decorative film, it is generally about 10 μm or more, about 20 μm or more, or about 50 μm or more and can be made to be about 500 μm or less, about 200 μm or less, or about 100 μm or less. The thickness of the transparent resin layer in a situation where the transparent resin layer is not flat signifies a thickness of the thinnest portion in the transparent resin layer.

In several embodiments, the storage elastic modulus of the transparent resin layer is about $1.0 \times 10^6$ Pa or more, about $1.5 \times 10^6$ Pa or more, or about $2.0 \times 10^6$ Pa or more and about $1.5 \times 10^8$ Pa or less or about $1.3 \times 10^8$ Pa or less in a temperature range of 100° C. to 150° C. when measured under the conditions of the frequency of 10 Hz and the shearing mode. By the storage elastic modulus of the transparent resin layer being in the above range, when stress, heat, or the like is applied to the decorative film or when the decorative film deforms, damage of the photoluminescent layer is prevented, the unevenly-shaped surface of the photoluminescent layer is maintained, and the visual effect that changes according to viewing angle can be exhibited.

Figure 2:
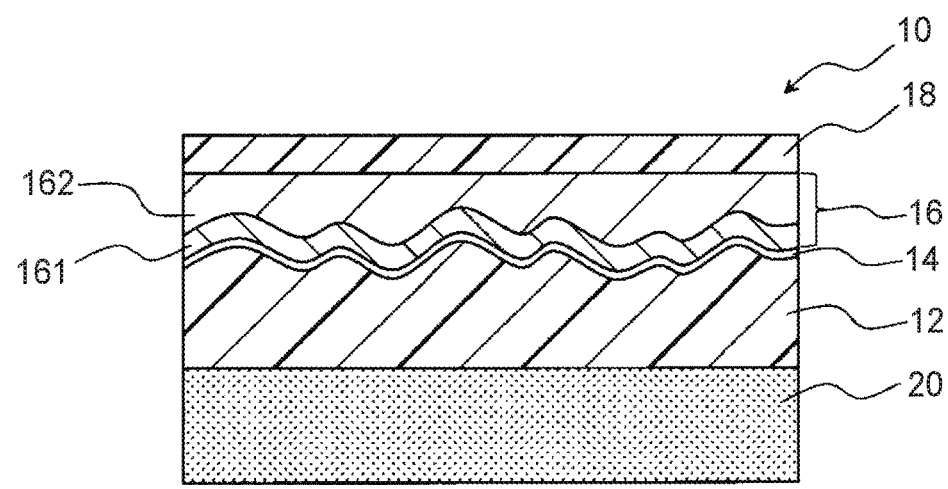
FIG. 2 is a cross-sectional view of the decorative film according to another embodiment of the present disclosure.

The transparent resin layer may be one layer or may have a multilayer structure. In a situation where the transparent resin layer has the multilayer structure, the storage elastic modulus of the transparent resin layer signifies one value measured for the multilayer structure overall where storage elastic moduli of individual layers are composited. The decorative film of another embodiment of the present disclosure where the transparent resin layer has the multilayer structure is illustrated in FIG. 2. The decorative film 10 in FIG. 2 has a multilayer structure where the transparent resin layer 16 is configured from a first transparent resin layer 161 and a second transparent resin layer 162.

In several embodiments, the storage elastic moduli of the substrate layer and the transparent resin layer are about $1.0 \times 10^6$ Pa or more, about $1.5 \times 10^6$ Pa or more, or about $2.0 \times 10^6$ Pa or more and about $1.5 \times 10^8$ Pa or less or about $1.3 \times 10^8$ Pa or less in a temperature range of 100° C. to 150° C. when measured under the conditions of the frequency of 10 Hz and the shearing mode. By a sandwich structure that supports the photoluminescent layer from both sides by the substrate layer and the transparent resin layer having the storage elastic moduli of the above range, when, for example, the decorative film is greatly deformed in a vacuum-molding method such as IM or the TOM, even when the decorative film is stretched to, for example, 200% or more or 100% or more in terms of surface area stretch rate, damage of the photoluminescent layer can be prevented, the unevenly-shaped surface of the photoluminescent layer can be maintained, and the visual effect that changes according to viewing angle can be exhibited.

The photoluminescent layer is a layer configuring the decorative film and may be, for example, a metal thin film including a metal such as aluminum, nickel, gold, platinum, chromium, iron, copper, tin, indium, silver, titanium, zinc, or germanium or an alloy or compound thereof formed by vacuum deposition, sputtering, ion plating, plating, or the like on the transparent resin layer or the substrate layer. Because such a metal thin film has high glossiness, a particularly excellent visual effect can be provided.

The photoluminescent layer may also be a photoluminescent resin layer with a pigment such as an aluminum photoluminescent material such as aluminum flakes, vapor-deposited aluminum flakes, metal-oxide-covered aluminum flakes, or colored aluminum flakes or a pearl photoluminescent material such as mica in flakes covered by a metal oxide such as iron oxide or a synthetic mica dispersed in a binder resin such as an acrylic resin or a polyurethane resin. The photoluminescent layer can also be a metal foil of aluminum, nickel, gold, silver, copper, or the like.

The unevenly-shaped surface of the photoluminescent layer can be formed by, for example, depositing the metal thin film on the transparent resin layer, which has an unevenly-shaped surface, or the substrate layer or by coating a photoluminescent resin layer composition thereon and drying or curing.

In one embodiment, the photoluminescent layer is formed by forming the first transparent resin layer by thinly coating the transparent resin layer composition on a mold or a sheet having an unevenly-shaped surface applied with a releasing treatment as necessary and drying or curing and depositing the metal thin film thereon or coating the photoluminescent resin layer composition thereon and drying or curing. Afterward, by removing a stacked body of the first transparent resin layer and the photoluminescent layer from the mold or the sheet and covering an unevenly-shaped surface of the first transparent resin layer on an opposite side of the photoluminescent layer with the second transparent resin layer, the design layer, or the outermost layer, a stacked body that becomes a portion of the decorative film is formed.

In another embodiment, the photoluminescent layer is formed by forming a substrate layer having an unevenly-shaped surface by pressure bonding a die having an embossed pattern onto the substrate layer while being heated as necessary and depositing the metal thin film thereon or coating the photoluminescent resin layer composition thereon and drying or curing.

In a situation where the binder resin of the photoluminescent resin layer is thermoplastic or in a situation where the photoluminescent layer includes the metal foil, it is also possible to impart the unevenly-shaped surface to the photoluminescent layer by pressure bonding a die having an embossed pattern onto the photoluminescent layer while heating as necessary.

A pattern or design of the unevenly-shaped surface of the photoluminescent layer may be regular or irregular and, while not limited in particular, can be parallel lines, a wood grain, a sand texture, a stone texture, a fabric texture, satin, a leather texture, matte, hairlines, spins, characters, symbols, geometric shapes, or the like. In a situation where the uneven shape is formed by grooves, a width of a groove is generally in a range of about 5 μm or more or about 10 μm or more and about 1 mm or less or about 100 μm or less.

A depth of the unevenly-shaped surface of the photoluminescent layer, indicated by t1 in FIG. 1, is determined as a height difference from a convex apex portion to a concave bottom portion continuous thereto. The depth of the unevenly-shaped surface of the photoluminescent layer may be uniform across an entirety of the unevenly-shaped surface or may be various values. The depth of the unevenly-shaped surface of the photoluminescent layer is generally in a range of about 5 μm or more or about 10 μm or more and about 100 μm or less or about 50 μm or less. By the depth of the unevenly-shaped surface of the photoluminescent layer being in the above range, the visual effect that changes according to viewing angle of the decorative film can be further heightened. In a pattern or design including a flat region such as the wood grain, a depth of a portion of the unevenly-shaped surface may be outside of the above range.

A thickness of the photoluminescent layer can be made to be, for example, about 10 nm or more, about 20 nm or more, or about 50 nm or more and about 100 µm or less, about 50 µm or less, or about 20 µm or less. By the thickness of the photoluminescent layer being in the above range, a surface (underlying surface) of the substrate article can be hidden, and the decorative film that can exhibit the visual effect that changes according to viewing angle can be obtained.

In a situation where the photoluminescent layer is the metal thin film formed by vacuum deposition, sputtering, or the like, the thickness of the photoluminescent layer can be made to be about 10 nm or more or about 20 nm or more and about 100 nm or less or about 80 nm or less. A decorative film that includes such an extremely thin photoluminescent layer can be suitably used particularly in a molding method such as the TOM that is accompanied by a great deformation of the decorative film, for example, stretching of about 100% or more in terms of surface area stretch rate.

In several embodiments, among the substrate layer and the transparent resin layer, the thickness of one or both of the layers having the storage elastic modulus of about $1 \times 10^6$ Pa to about $1.5 \times 10^8$ Pa in the temperature range of 100° C. to 150° C. when measured under the conditions of the frequency of 10 Hz and the shearing mode is about 1.0 times or more, about 1.2 times or more, or about 1.5 times or more and about 3.0 times or less, about 2.5 times or less, or about 2.0 times less than the depth of the unevenly-shaped surface of the photoluminescent layer.

The decorative film of the present disclosure is provided with the outermost layer and does not require a treatment such as a separate surface-protecting coating after applying the decorative film on the article. As the outermost layer, various resins, for example, an acrylic resin that includes polymethyl methacrylate (PMM) and a (meth)acryl copolymer; polyurethane; a fluororesin such as an ethylene-tetrafluoroethylene copolymer (ETFE), polyvinylidene fluoride (PVDF), or a methyl methacrylate-vinylidene fluoride copolymer (PMMA/PVDF); polyvinyl chloride (PVC); a polycarbonate (PC); a polyolefin such as polyethylene (PE) or polypropylene (PP); a polyester such as polyethylene terephthalate (PET) or polyethylene naphthalate; a copolymer such as an ethylene/acrylic acid copolymer (EAA) and an ionomer thereof, an ethylene-ethyl acrylate copolymer, or an ethylene-vinyl acetate copolymer; or a mixture thereof can be used. By excelling in weather resistance, the acrylic resin, polyurethane, a fluororesin, and polyvinyl chloride are preferable, and by excelling in abrasion resistance and having a small environmental impact when burned as waste or disposed of in a landfill, the acrylic resin and polyurethane are more preferable. The outermost layer may have a multilayer structure. For example, the outermost layer may be a stacked body of films formed from the above resins or may be a multilayer coating of the above resins.

The outermost layer can be formed by coating a resin composition on another layer configuring the decorative film, that is, the transparent resin layer; the design layer or the joining layer that are the optional elements; or the like. Alternatively, the outermost layer can be formed by coating the resin composition on another liner and laminating this film on the other layers via the joining layer. In a situation where the transparent resin layer, the design layer, or the like is adhesive relative to the outermost layer film formed on the liner, the outermost layer film can be directly laminated onto these layers without the joining layer interposed therebetween. For example, the outer most layer film can be formed by coating a resin material such as a curable acrylic resin composition or a reactive polyurethane composition on the liner by knife coating, bar coating, blade coating, doctor coating, roll coating, casting coating, or the like and heating and curing as necessary.

As the outermost layer, one formed in advance into a film shape by extrusion, stretching, or the like may be used. Such a film can be laminated onto the transparent resin layer, the design layer, or the like via the joining layer. Alternatively, in a situation where the transparent resin layer, the design layer, or the like is adhesive relative to such a film, the film can be directly laminated onto these layers without the joining layer interposed therebetween. By using a film with high flatness, an appearance with a higher surface flatness can be imparted to the structure. Moreover, the outermost layer can be formed by multilayer extrusion with other layers. As an acrylic film, a resin that includes polymethyl methacrylate (PMMA), butyl polyacrylate, a (meth)acryl copolymer, an ethylene/acryl copolymer, or an ethylene vinyl acetate/acryl copolymer can be used by being made into a film shape. The acrylic film excels in transparency, is strong against heat and light, and is less likely to fade or have glossiness changes even when used outdoors. Moreover, it excels in stain resistance even without using a plasticizer and also has characteristics of excelling in moldability and being able to be deep drawn. In particular, one whose main component is PMMA is preferable. The outermost layer may have a three-dimensional surface such as an embossed pattern on a surface thereof.

A thickness of the outermost layer may be various but is generally about 1 µm or more, about 5 µm or more, or about 10 µm or more and about 200 µm or less, about 100 µm or less, or about 80 µm or less. In a situation of applying the decorative film to an article of a complex shape, the outermost layer is more advantageous being thin from a viewpoint of shape tracking and is desirably, for example, about 100 µm or less or about 80 µm or less. Meanwhile, in a situation of imparting high light resistance and/or weather resistance to the structure, the outermost layer is more advantageous being thick and is desirably, for example, about 5 µm or more or about 10 µm or more.

The outermost layer may include as necessary an ultraviolet absorber such as benzotriazole, Tinuvin (trademark) 400 (made by BASF), a hindered-amine light stabilizer (HALS) such as Tinuvin (trademark) 292 (made by BASF), or the like. By using an ultraviolet absorber, a hindered-amine light stabilizer, or the like, discoloration, fading, degradation, and the like of a colorant included in the design layer or the like—in particular, of an organic pigment whose sensitivity to light such as ultraviolet light is comparatively high—can be effectively prevented. The outermost layer may include a hard-coat material, a glossing agent, or the like and may have an additional hard-coat layer. The outermost layer is generally transparent but, in order to provide a target appearance, may be entirely or partially semitransparent or may be partially nontransparent.

Figure 3:
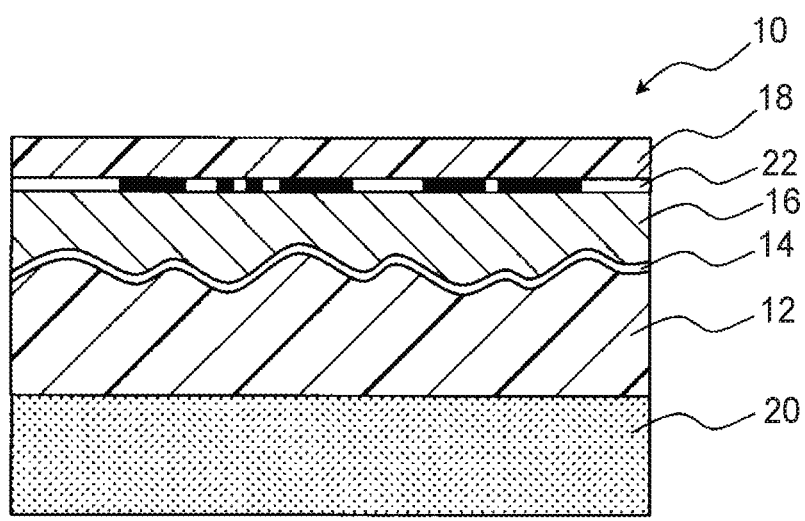
FIG. 3 is a cross-sectional view of the decorative film according to yet another embodiment of the present disclosure.

In one embodiment, the decorative film further includes the design layer between the outermost layer and the transparent resin layer. The decorative film of such an embodiment is illustrated in FIG. 3. The decorative film 10 in FIG. 3 further has a design layer 22 disposed between the outermost layer 18 and the transparent resin layer 16.

As the design layer, a color layer exhibiting a painted color or the like; a pattern layer imparting a pattern, logo, picture, or the like such as a wood grain, a stone texture, a geometrical pattern, or a leather texture; a relief (relief pattern) layer provided with an uneven shape on a surface; or the like and a combination thereof can be mentioned.

As the color layer, one where a pigment such as an inorganic pigment such as titanium oxide, carbon black, chrome yellow, yellow iron oxide, colcothar, or red iron oxide or an organic pigment such as a phthalocyanine pigment such as phthalocyanine blue or phthalocyanine green, an azolake pigment, an indigo pigment, a perynone pigment, a perylene pigment, a quinophthalone pigment, a dioxazine pigment, or a quinacridone pigment such as quinacridone red is dispersed in a binder resin such as an acrylic resin or a polyurethane resin can be used.

As the pattern layer, a film, a sheet, or the like having a pattern, a logo, a picture, or the like formed by printing such as gravure direct printing, gravure offset printing, inkjet printing, laser printing, or screen printing; by coating such as gravure coating, roll coating, die coating, bar coating, or knife coating; by punching; by etching; or the like can be used.

As the relief layer, a thermoplastic resin film having an uneven shape on a surface by a conventionally-known method such as an embossing process, a scratching process, a laser process, a dry etching process, or a heat-pressing process can be used. The relief layer can also be formed by coating a thermosetting or radiation-curable resin such as a curable acrylic resin on a release film having an uneven shape, curing by heating or irradiation, and removing the release film. The thermoplastic resin, the thermosetting resin, and the radiation-curable resin used in the relief layer are not limited in particular, but a fluororesin, a polyester resin such as PET or PEN, an acrylic resin, polyethylene, polypropylene, a thermoplastic elastomer, a polycarbonate, a polyamide, an ABS resin, an acrylonitrile-styrene resin, polystyrene, vinyl chloride, polyurethane, or the like can be used.

A thickness of the design layer may be various and can generally be made to be about 0.5 µm or more, about 5 µm or more, or about 20 µm or more and about 300 µm or less, about 200 µm or less, or about 100 µm or less.

The decorative film may further include an adhesive layer for installing the decorative film to the article. As the adhesive layer, an adhesive of a solvent type, an emulsion type, a pressure-sensitive type, a heat-sensitive type, a thermosetting type, or an ultraviolet-curable type such as an acrylic, a polyolefin, a polyurethane, a polyester, or a rubber adhesive that is generally used can be used; a thermosetting polyurethane adhesive can be used advantageously. A thickness of the adhesive layer can generally be made to be about 5 µm or more, about 10 µm or more, or about 20 µm or more and about 200 µm or less, about 100 µm or less, or about 80 µm or less.

As a release layer for protecting the adhesive layer or the adhesive substrate layer, any suitable release liner can be used. As representative release liners, those prepared from paper (for example, craft paper) or those prepared from a polymer material (for example, a polyolefin such as polyethylene or polypropylene, ethylene vinyl acetate, polyurethane, a polyesters such as polyethylene terephthalate, or the like) can be mentioned. The release liner may also be coated as necessary by a layer of a release agent of a silicone-containing material, a fluorocarbon-containing material, or the like.

A thickness of the release layer is generally about 5 µm or more, about 15 µm or more, or about 25 µm or more and about 300 µm or less, about 200 µm or less, or about 150 µm or less.

The joining layer may be used to join the above layers. As the joining layer, an adhesive of a solvent type, an emulsion type, a pressure-sensitive type, a heat-sensitive type, a thermosetting type, or an ultraviolet-curable type such as an acrylic, a polyolefin, a polyurethane, a polyester, or a rubber adhesive that is generally used can be used; a thermosetting polyurethane adhesive can be used advantageously. A thickness of the joining layer can generally be made to be about 0.05 µm or more, about 0.5 µm or more, or about 5 µm or more and about 100 µm or less, about 50 µm or less, or about 20 µm or less. In a situation where the joining layer is formed from a transparent resin and is adjacent to so as to be in contact with the transparent resin layer, the joining layer is deemed to be a portion of the transparent resin layer.

The outermost layer, the transparent resin layer, the substrate layer, the adhesive layer, and/or the joining layer may include a colorant such as the same inorganic pigment, organic pigment, or the like described with regard to the design layer.

In a decorative film that includes as the photoluminescent layer the metal thin film such as a tin vapor-deposited film or an indium vapor-deposited film, for example, a decorative film used as a chrome-plating substitution film, a performance of concealing the substrate article can be increased by including the above pigment in the substrate layer, the adhesive layer, and the like. The tin vapor-deposited film and the like may have vapor deposition defects such as pinholes on a vapor-deposited film surface, but such defects can be made to stand out less by coloring the substrate layer, the adhesive layer, and the like.

It is advantageous for an amount of the pigment included in the above layers to be about 0.1% or more by mass, about 0.2% or more by mass, or about 0.5% or more by mass and about 50% or less by mass, about 20% or less by mass, or about 10% or less by mass of the above layers.

A thickness of the decorative film is generally about 25 µm or more, about 50 µm or more, or about 100 µm or more and about 2 mm or less, about 1 mm or less, or about 500 µm or less. By having the thickness of the decorative film be in the above range, the decorative film can sufficiently track even an article having a complex shape so as to provide a structure having an excellent appearance.

In several embodiments, a thickness from the convex apex portion of the photoluminescent layer to the outermost layer surface is about 10 µm or more, about 20 µm or more, or about 50 µm or more and about 300 µm or less, about 200 µm or less, or about 150 µm or less. In FIG. 1, t2 indicates the thickness from the convex apex portion of the photoluminescent layer to the outermost layer surface. By having the thickness from the convex apex portion of the photoluminescent layer to the outermost layer surface be in the above range, the visual effect that changes according to viewing angle can be further heightened and the decorative film can be made thin such that the decorative film favorably tracks a surface of an article having a three-dimensional shape.

A scratch resistance of the decorative film can be evaluated by pencil hardness according to JISK5600-5-4. A decorative film of a certain embodiment has a pencil hardness of 2B or more when the decorative film is fixed on a glass plate with the adhesive layer or a polyurethane heating adhesive layer facing a surface of the glass plate and the outermost layer is scratched at a speed of 600 mm/minute.

The pencil hardness can be made to be 6B or more, 5B or more, 4B or more, or 3B or more.

A manufacture method of the decorative film is not limited in particular. Each layer can be manufactured as already described. The decorative film can be manufactured by, for example, forming each layer on a liner such as a PET film whose surface is release treated or another layer configuring the decorative film and stacking these. Alternatively, a coating process and, as necessary, a drying or a curing process can be repeated on one liner to sequentially stack each layer. Materials of a portion of the layers of the decorative film can be extruded in a single layer or extruded in a multilayer.

According to one embodiment of the present disclosure, the article that covers the decorative film on the substrate article to be integrated therewith is provided. For example, by applying the decorative film to the article by IM or the TOM, the article where the decorative film and the substrate article are integrated can be formed. In another embodiment, by extruding a thermoplastic material that becomes the substrate article on the decorative film, an article where the decorative film and the extruded thermoplastic material are integrated can be formed. IM, the TOM, and extrusion can be performed by conventionally-known methods.

The substrate article can be made from various materials, for example, polypropylene, a polycarbonate, an acrylonitrile-butadiene-styrene copolymer, or a mixture or blend thereof, and a material having various planes and three-dimensional shapes can be used.

A maximum surface area stretch rate of the decorative film after molding is generally about 50% or more, about 100% or more, or about 200% or more and about 1,000% or less, about 500% or less, or about 300% or less. The surface area stretch rate is defined such that surface area stretch rate (%)=(B−A)/A (A: surface area before molding of a certain portion of the decorative film, B: surface area after molding of a portion corresponding to A of the decorative film). For example, in a situation where the surface area of the certain portion of the decorative film is 100 cm² before molding and this portion becomes 250 cm² on the surface of the article after molding, the surface area stretch rate is 150%. The maximum surface area stretch rate indicates a value of a location with the highest surface area stretch rate in the decorative film in the entire surface area of the molded article. When a flat film is affixed by the TOM to the article having the three-dimensional shape, the surface area stretch rate greatly differs according to location; for example, a portion where the film first contacts the article hardly stretches and has a surface area stretch rate of substantially 0%, and at an end portion that is affixed last, the film is greatly stretched such that the surface area stretch rate becomes 200% or more. Because whether a defect such as non-tracking of the article or tearing of the film at a portion where the film is stretched the most occurs determines success or failure of molding, the surface area stretch rate of the portion that is stretched the most, that is, the maximum surface area stretch rate and not an average surface area stretch rate of the entire molded article serves as a substantial indicator of success or failure of the molded article. The maximum surface area stretch rate can be confirmed by, for example, printing squares of 1 mm square on an entire surface of the decorative film before molding and measuring a surface area change thereof after molding or measuring the thickness of the decorative film before and after molding.

The decorative film of the present disclosure can be used in various molding technologies such as the TOM, IM, and extrusion methods with an object of decorating an automobile component, a home appliance, a vehicle (railroad or the like), a building material, or the like and can be suitably used particularly in the TOM.

EXAMPLES

A specific embodiment of the present disclosure is illustrated in the following example, but the present invention is not limited thereto. Parts and percentages are all by mass unless otherwise indicated.

Reagents, raw materials, and the like used in the present example are indicated in Table 1 below.

TABLE 1

| Compound Name, Product Name, Or Abbreviation | Description | Obtained From |
| --- | --- | --- |
| Resamine (trademark) D6260 | Water-based polyurethane resin, 20% solid content by mass | Dainichiseika Color & Chemicals Mfg. Co., Ltd. (Chūo-ku, Tokyo, Japan) |
| Resamine (trademark) D28 | Water-based polyurethane thickener, 17.5% solid content by mass | Dainichiseika Color & Chemicals Mfg. Co., Ltd. (Chūo-ku, Tokyo, Japan) |
| Surfynol (trademark) 104E | Wetting agent | Air Products and Chemicals, Inc. (Kawasaki-shi, Kanagawa-ken, Japan) |
| SK Diene (trademark) 1506BHE | Acrylic adhesive, 33% solid content by mass | Soken Chemical & Engineering Co., Ltd. (Toshima-ku, Tokyo, Japan) |
| Julimer (trademark) YM-5 | Acrylic polymer, 40% solid content by mass | Toagosei Co., Ltd. (Minato-ku, Tokyo, Japan) |
| E-5XM | Epoxy cross-linking agent | Soken Chemical & Engineering Co., Ltd. (Toshima-ku, Tokyo, Japan) |
| Polyment (trademark) NK-350 | Aminoethylated acrylic polymer | Nippon Shokubai Co., Ltd. (Chūo-ku, Osaka-shi, Japan) |
| Praxel (trademark) 205H | Bifunctional polycaprolactone oligomer | Daicel Corporation (Kita-ku, Osaka-shi, Japan) |
| Duranate (trademark) TLA-100 | Isocyanurate cross-linking agent, 23.5% NCO content | Asahi Kasei Chemicals Corporation (Chiyoda-ku, Tokyo, Japan) |
| Duranate (trademark) TPA-100 | Isocyanurate cross-linking agent, 23.1% NCO content | Asahi Kasei Chemicals Corporation (Chiyoda-ku, Tokyo, Japan) |
| SBM-NT | Gravure printing ink | Dainichiseika Color & Chemicals Mfg. Co., Ltd. (Chūo-ku, Tokyo, Japan) |
| SEIKABOND (trademark) E-295NT | 60%-by-mass ethyl acetate solution of polyester polyol | Dainichiseika Color & Chemicals Mfg. Co., Ltd. (Chūo-ku, Tokyo, Japan) |
| SEIKABOND (trademark) C-55 | Curing agent | Dainichiseika Color & Chemicals Mfg. Co., Ltd. (Chūo-ku, Tokyo, Japan) |

TABLE 1-continued

| Compound Name, Product Name, Or Abbreviation | Description | Obtained From |
|---|---|---|
| Non-Stretching PP Film | Thickness of 50 μm | Mitsubishi Plastics, Inc. (Chiyoda-ku, Tokyo, Japan) |
| TD280EA | Aluminum flakes | Toyo Aluminum K.K. (Osaka-shi, Osaka, Japan) |

Viscoelastic Properties

Viscoelastic properties of the layers configuring the decorative film are determined by the storage elastic modulus G' (Pa) at 100° C. to 150° C. in the shearing mode and at a frequency of 10.0 Hz using the dynamic viscoelasticity measurement device, ARES (made by TA Instruments Japan Inc., Shinagawa-ku, Tokyo, Japan).

Example 1

A decorative film having a wood grain pattern of example 1 is made in the following procedure.

(1) Wood-Grain-Pattern-Embossed Release Film

A release film is prepared where around a PET film of a thickness of 50 μm and on both sides of the PET film is disposed a non-stretching polypropylene film of a thickness of 60 μm. An embossed pattern of a wood grain is formed on the release film by heating and pressure bonding a die etched with a wood grain onto the release film.

(2) First Transparent Resin Layer

A water-based polyurethane solution is prepared by mixing 93.85 parts by mass of Resamine (trademark) D6260, 0.99 parts by mass of Resamine (trademark) D28, 0.47 parts by mass of Surfinol (trademark) 104E, and 4.69 parts by mass of isopropanol. The obtained water-based polyurethane solution is coated on the wood-grain-pattern-embossed release film using a knife coater and heated and dried for 5 minutes at 120° C. to form the first transparent resin layer of polyurethane of a thickness of 10 μm.

(3) Photoluminescent Layer (Tin Vapor-Deposited Film)

As the photoluminescent layer, a tin vapor-deposited film is deposited on a surface of the first transparent resin film under the following conditions. The formed photoluminescent layer has an unevenly-shaped surface, and a maximum depth thereof is in a range of 30 μm to 50 μm.

Device: Vacuum Vapor Deposition Device EX-400 (made by Ulvac, Inc.; Chigasaki-shi, Kanagawa-ken, Japan)

Energy source of target metal vaporization: Electron beam

Film formation speed of tin vapor-deposited film: 5 ångströms/second

Thickness of tin vapor-deposited film: 43 nm (430 ångströms)

(4) Polyurethane Substrate Layer

The water-based polyurethane solution used in forming the first transparent resin layer is coated with a knife coater on the tin vapor-deposited film and heated and dried for 5 minutes at 120° C. to form a polyurethane substrate layer of a thickness of 20 μm. A storage elastic modulus of the polyurethane substrate layer was $1.1 \times 10^8$ Pa to $6.2 \times 10^6$ Pa in a temperature range of 100 to 150° C. when measured under the conditions of the frequency of 10 Hz and the shearing mode.

(5) Acrylic Adhesive Layer

An acrylic adhesive solution is prepared by mixing 49.95 parts by parts by mass of SK-Diene (registered trademark) 1506BHE, 18.14 parts by mass of Julimer (registered trademark) YM-5, 0.54 parts by mass of E-5XM, and 31.36 parts by mass of methyl isobutyl ketone. The obtained acrylic adhesive solution is coated on the release-treated PET film with a knife coater and heated and dried for 5 minutes at 120° C. to form an acrylic adhesive layer of a thickness of 40 μm.

(6) Acrylic Primer Layer

An acrylic primer solution is prepared by mixing 8.57 parts by mass of Polyment (registered trademark) NK-350 and 91.43 parts by mass of methyl isobutyl ketone. The obtained acrylic primer solution is coated on the polyurethane substrate layer with a wire bar such that a dried thickness is 7 μm and dried at room temperature.

(7) Stacking of Acrylic Adhesive Layer

The acrylic adhesive layer is heated and stacked on the acrylic primer layer using a roll laminator at 50° C. Next, the wood-grain-pattern-embossed release film is removed.

(8) Second Transparent Resin Layer

A 2K solvent-free polyurethane composition is prepared by mixing Praxel (trademark) 205H and Duranate (trademark) TLA-100 such that a mole ratio of NCO/OH is 1.0. The obtained 2K solvent-free polyurethane composition is coated on the first transparent resin layer at an amount sufficient to form a flat surface and cured by being heated for 24 hours at 50° C. to form a second transparent resin layer of a maximum thickness of 30 μm. A storage elastic modulus of the transparent resin layer made from the first transparent resin layer and the second transparent resin layer was $3.7 \times 10^7$ Pa to $2.3 \times 10^6$ Pa in the temperature range of 100 to 150° C. when measured under the conditions of the frequency of 10 Hz and the shearing mode.

(9) Acrylic Resin Outermost Layer

An acrylic copolymer where methyl methacrylate (MMA)/2-hydroxyethyl methacrylate (HEMA)=97% by mass/3% by mass is prepared by general solution polymerization to be obtained in a form of an ethyl acetate/butyl acetate solution of a solid content of 30% by mass. To this solution, an isocyanurate cross-linking agent, Duranate (trademark) TPA-100 is added at a solid content of 2.7% by mass relative to the copolymer. The obtained solution is coated on a polyester film of a thickness of 75 μm and dried for 5 minutes at 120° C. In this manner, an acrylic resin outermost layer of a thickness of 30 μm is obtained on the polyester film.

(10) Design Layer (Wood Grain Pattern)

A wood grain pattern is printed on the acrylic resin outermost layer by gravure printing using SBM-NT to form the design layer.

(11) Polyurethane Joining Layer

A polyurethane joining layer solution is prepared by mixing 54.8 parts by mass of SEIKABOND (registered trademark) E-295NT, 1.37 parts by mass of SEIKABOND (registered trademark) C-55, and 43.8 parts by mass of cyclohexanone. The obtained polyurethane joining layer solution is coated on the design layer and heated and dried for 5 minutes at 100° to form a polyurethane joining layer of a thickness of 15 μm.

(12) Stacking

The polyurethane joining layer is heated and stacked on a flat surface of the second transparent resin layer using a roll laminator at 50° C. Next, the polyester film is removed to obtain the decorative film having the wood grain pattern of example 1. A thickness of the decorative film was 150 and a thickness from the convex apex portion of the photoluminescent layer to the outermost layer surface was 60 μm.

In the decorative film of example 1, by changing a viewing angle, a different appearance was recognized, like a sliced natural wood veneer. Upon observing an appearance of the film after adhering this decorative film onto a PC/ABS board (CK43 Black, made by Techno Polymer Co., Ltd.; Minato-ku, Tokyo, Japan) using the TOM so a surface area stretch rate is 100% at a molding temperature of 135° C., as was the case before stretching, a different appearance was recognized by changing the viewing angle. The decorative film of example 1 can be suitably applied to molded interior components of an automobile or the like by using a vacuum molding method such as the TOM.

Example 2 and Example 3

Decorative films exhibiting a blue glossiness of example 2 and example 3 are made in the following procedure.

An embossed release film is prepared where around a PET film of a thickness of 50 μm and on both sides of the PET film is disposed a non-stretching polypropylene film of a thickness of 60 μm. The water-based polyurethane solution of example 1 is coated at a thickness of 10 μm (example 2) or 30 μm (example 3) on the embossed release film using a knife coater and heated and dried for 5 minutes at 120° C. to form a first transparent resin layer of polyurethane.

As the photoluminescent layer, a tin vapor-deposited film is deposited on a surface of the first transparent resin film under the following conditions. The formed photoluminescent layer has an unevenly-shaped surface, and a depth thereof is in a range of 10 μm to 20 μm (example 2) or 10 μm to 5 μm (example 3).

Device: Vacuum Vapor Deposition Device EX-400 (made by Ulvac, Inc.; Chigasaki-shi, Kanagawa-ken, Japan)

Energy source of target metal vaporization: Electron beam

Film formation speed of tin vapor-deposited film: 5 ångströms/second

Thickness of tin vapor-deposited film: 43 nm (430 ångströms)

The water-based polyurethane solution of example 1 is coated with a knife coater on the tin vapor-deposited film and heated and dried for 5 minutes at 120° C. to form a polyurethane substrate layer of a thickness of 20 μm.

An acrylic adhesive solution is prepared by mixing a 35%-by-mass ethyl acetate solution of 100 parts by mass of an n-butyl acrylate/acrylic acid copolymer (n-butyl acrylate/acrylic acid=94/6 [mass ratio], weight-average molecular weight 600,000), a 40%-by-mass ethyl acetate solution of 37.5 parts by mass of a methyl methacrylate/n-butyl methacrylate/dimethyl aminoethyl methacrylate copolymer (methyl methacrylate/n-butyl methacrylate/dimethyl aminoethyl methacrylate=60/34/6 [mass ratio], weight-average molecular weight 70,000), and 1.0 parts by mass of E-5XM as a cross-linking agent. The obtained acrylic adhesive solution is coated on the release-treated PET film with a knife coater and heated and dried for 5 minutes at 120° C. to form an acrylic adhesive layer of a thickness of 40 μm.

The acrylic primer solution of example 1 is coated on the polyurethane substrate layer with a wire bar such that a dried thickness is 7 μm and dried at room temperature. The acrylic adhesive layer is heated and stacked on the acrylic primer layer using a roll laminator at 50° C. Next, the embossed release film is removed.

The 2K solvent-free polyurethane composition of example 1 is coated on the first transparent resin layer at an amount sufficient to form a flat surface and cured by being heated for 12 hours at 80° C. to form a second transparent resin layer of a maximum thickness of 30 μm.

An acrylic resin outermost layer is formed similarly to example 1. A blue acrylic solution prepared by mixing a blue pigment into an ethyl acetate/butyl acetate solution of a solid content of 30% by mass of the acrylic resin outermost layer is coated on a polyester film of a thickness of 75 μm with a knife coater and heated for 5 minutes at 120° C. to form a blue, transparent acrylic resin outermost layer. Afterward, a polyurethane joining layer is formed on the acrylic resin outermost layer similarly to example 1.

The polyurethane joining layer is heated and stacked on a flat surface of the second transparent resin layer using a roll laminator at 50° C. Next, the polyester film is removed to obtain the decorative film having the blue glossiness of example 2 and example 3.

An appearance of the film was observed after adhering the obtained decorative film onto a PC/ABS board (CK43 Black, made by Techno Polymer Co., Ltd.; Minato-ku, Tokyo, Japan) using the TOM so a surface area stretch rate is 100% at a molding temperature of 135° C. Both example 2 and example 3 exhibited an appearance where a glossiness of the film (corresponding to a reflectance) was favorable and deep. An appearance of example 2 was sharp compared to example 3. This suggests that the unevenly-shaped surface of the embossed release film is more faithfully reproduced in the photoluminescent layer of example 2.

Example 4

A decorative film exhibiting a blue glossiness of example 4 is made in the following procedure.

An acrylic copolymer where methyl methacrylate (MMA)/2-hydroxyethyl methacrylate (HEMA)=97% by mass/3% by mass is prepared by general solution polymerization to be obtained in a form of an ethyl acetate/butyl acetate solution of a solid content of 30% by mass. A photoluminescent layer solution prepared by mixing into the above solution 4 parts by mass of aluminum flakes (TD280EA, made by Toyo Aluminum K.K.; Osaka-shi, Osaka, Japan) relative to 100 parts by mass (solid content) of the acrylic copolymer is first coated on an embossed release film so a dried thickness is 30 μm and then dried for 5 minutes in an oven at 120° C. to form a photoluminescent layer including the aluminum flakes.

The water-based polyurethane solution of example 1 is coated with a knife coater on the photoluminescent layer and dried for 5 minutes at 120° C. to form a polyurethane substrate layer of a thickness of 30 μm. Afterward, an acrylic primer layer is formed on a surface of the polyurethane substrate layer similarly to example 2, an acrylic adhesive layer is stacked thereon, and the embossed release film is removed.

The 2K solvent-free polyurethane composition of example 1 is coated on the photoluminescent layer at an amount sufficient to form a flat surface and cured by being heated for 24 hours at 50° C. to form a transparent resin layer of a maximum thickness of 30 μm. A blue and transparent acrylic resin outermost layer similar to example 2 and a polyurethane joining layer are formed. The polyurethane joining layer is heated and stacked on a flat surface of the transparent resin layer using a roll laminator at 50° C. and the polyester film is removed to obtain the decorative film exhibiting the blue glossiness of example 4.

An appearance of the film was observed after adhering the obtained decorative film onto a PC/ABS board (CK43 Black, made by Techno Polymer Co., Ltd.; Minato-ku, Tokyo, Japan) using the TOM so a surface area stretch rate is 100% at a molding temperature of 135° C. Compared to example 2 and example 3, a glossiness of the film (corresponding to a reflectance) was low, but an appearance of example 4 was sharp, similarly to example 2, which suggests that the unevenly-shaped surface of the embossed release film is, as in example 2, faithfully reproduced in the photoluminescent layer of example 4.

The invention claimed is:

1. A decorative film that includes a substrate layer comprising a polyurethane, polyvinyl chloride, polyethylene terephthalate, acrylonitrile-butadiene-styrene copolymer or polycarbonate, with the substrate layer having an unevenly-shaped surface, a photoluminescent layer that is adjacent to the substrate layer and conforms to the unevenly-shaped surface of the substrate layer, the photoluminescent layer having a thickness sufficient to obtain a decorative film having a visual effect that changes according to viewing angle, a multilayer transparent resin layer adjacent to the photoluminescent layer, wherein the multilayer transparent resin layer comprises first and second transparent resin layers, the first transparent resin layer having opposing major surfaces, each of which conforms to the unevenly-shaped surface of the substrate layer, and an outermost layer, either the photoluminescent layer directly contacts the substrate layer or the photoluminescent layer is separated from the substrate layer by a maximum distance of about 10 pm, and a storage elastic modulus of at least the substrate layer or the multilayer transparent resin layer is $1\times10^6$ Pa to $1.5\times10^8$ Pa in a temperature range of 100° C. to 150° C. when measured under conditions of a frequency of 10 Hz and a shearing mode.

2. The decorative film according to claim 1, wherein storage elastic moduli of the substrate layer and the multilayer transparent resin layer are $1\times10^6$ Pa to $1.5\times10^8$ Pa in the temperature range of 100° C. to 150° C. when measured under the conditions of the frequency of 10 Hz and the shearing mode.

3. The decorative film according to claim 1, further including a design layer between the outermost layer and the multilayer transparent resin layer.

4. The decorative film according to claim 1, wherein a thickness of at least the substrate layer or the multilayer transparent resin layer having the storage elastic modulus of $1\times10^6$ Pa to $1.5\times10^8$ Pa in the temperature range of 100° C. to 150° C. when measured under the conditions of the frequency of 10 Hz and the shearing mode is 1.0 to 3.0 times a depth of the unevenly-shaped surface of the photoluminescent layer.

5. The decorative film according to claim 1, wherein the unevenly-shaped surface of the photoluminescent layer has convex apex portions and concave bottom portions, and the depth of the unevenly-shaped surface of the photoluminescent layer, as measured from any convex apex portion to a concave bottom portion continuous thereto, is in the range of from 5 μm to 100 μm.

6. The decorative film according to claim 1, wherein the unevenly-shaped surface of the photoluminescent layer has convex apex portions and concave bottom portions, and a thickness from a convex apex portion to an outermost layer surface of the decorative film is in the range of from 10 μm to 300 μm.

7. The decorative film according to claim 1, wherein a thickness of the photoluminescent layer is 10 nm to 100 μm.

8. An article that comprises the decorative film according to claim 1 and a substrate article integrated therewith.

9. The decorative film of claim 1, wherein the second transparent resin layer has opposing major surfaces, only one of which conforms to the unevenly-shaped surface of the substrate layer.

10. The decorative film of claim 1, wherein the first and second transparent resin layers are continuous layers.

* * * * *

UNITED STATES PATENT AND TRADEMARK OFFICE
CERTIFICATE OF CORRECTION

PATENT NO. : 10,661,597 B2  
APPLICATION NO. : 15/543423  
DATED : May 26, 2020  
INVENTOR(S) : Norihito Shibahara Page 1 of 1

It is certified that error appears in the above-identified patent and that said Letters Patent is hereby corrected as shown below:

In the Specification

Column 15
Line 6, after "150" insert -- µm, --.

In the Claims

Column 17
Line 34, in Claim 1, delete "pm," and insert -- µm, --, therefor.

Signed and Sealed this
Seventh Day of July, 2020

Andrei Iancu
*Director of the United States Patent and Trademark Office*